United States Patent [19]

Holz

[11] 4,110,588
[45] Aug. 29, 1979

[54] INDIRECT INDUCTION APPARATUS FOR HEATING FLUIDS

[76] Inventor: George E. Holz, 97 Grandview Ave., N. Plainfield, N.J. 07060

[21] Appl. No.: 716,954

[22] Filed: Aug. 23, 1976

[51] Int. Cl.² .............................................. H05B 5/04
[52] U.S. Cl. ........................ 219/10.49 R; 219/10.77; 219/499
[58] Field of Search .............. 219/10.49, 10.51, 10.75, 219/10.77, 499, 449, 450

[56] References Cited

U.S. PATENT DOCUMENTS

| | | | |
|---|---|---|---|
| 2,858,405 | 10/1958 | Kimbrough et al. | 219/10.75 |
| 3,299,345 | 1/1967 | Werts | 219/499 |
| 3,530,499 | 9/1970 | Schroeder | 219/10.49 |
| 3,710,062 | 1/1973 | Peters | 219/10.49 |
| 3,823,297 | 7/1974 | Cunningham | 219/10.77 |

Primary Examiner—Bruce A. Reynolds
Attorney, Agent, or Firm—Robert A. Green

[57] ABSTRACT

The apparatus includes a cup having a metal base and seated on an insulating support, beneath which is positioned an electrical coil, by means of which heating currents are induced in the metal base of the cup, and this heat is transferred to the fluid which is in the cup, in contact with the metal base. A control circuit is provided including means for generating the heating currents and for selecting the desired temperature. The circuit includes a thermal sensor in heat transfer relation with the cup and coupled to the circuit which controls the operation of the oscillator and the heating of the fluid in the cup to the desired temperature.

9 Claims, 6 Drawing Figures

4,110,588

INDIRECT INDUCTION APPARATUS FOR HEATING FLUIDS

BACKGROUND OF THE INVENTION

Color photography workers who develop color film require a plurality of heated chemical fluids to develop the film. At the present time, in the photography arts, chemicals are heated by first heating a tank with hot water poured into the tank, removing the water when the water is at the desired temperature, and then pouring the chemical into the tank to absorb the heat stored therein. This is clearly an undesirable procedure. Immersion heaters might be used, with one being provided, preferably, for each chemical to be heated. If only one immersion heater were employed, it would have to be washed after each separate heating operation. In addition, care must be taken with immersion heaters since they burn up if removed from the fluid without being disconnected.

DESCRIPTION OF THE DRAWINGS

FIG. 4 is a curve showing the output voltage of the oscillator when generating heating current and when heat is not called for;

DESCRIPTION OF THE PREFERRED EMBODIMENTS

Figure 1:
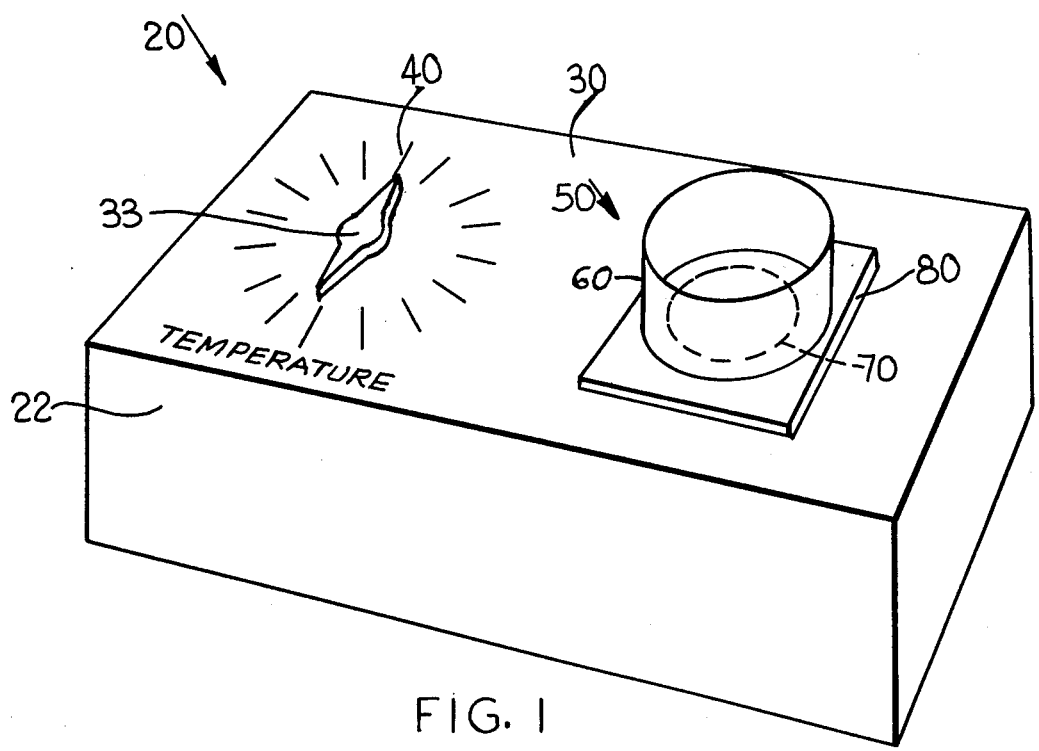
FIG. 1 is a perspective view of apparatus embodying the invention.
Figure 2:
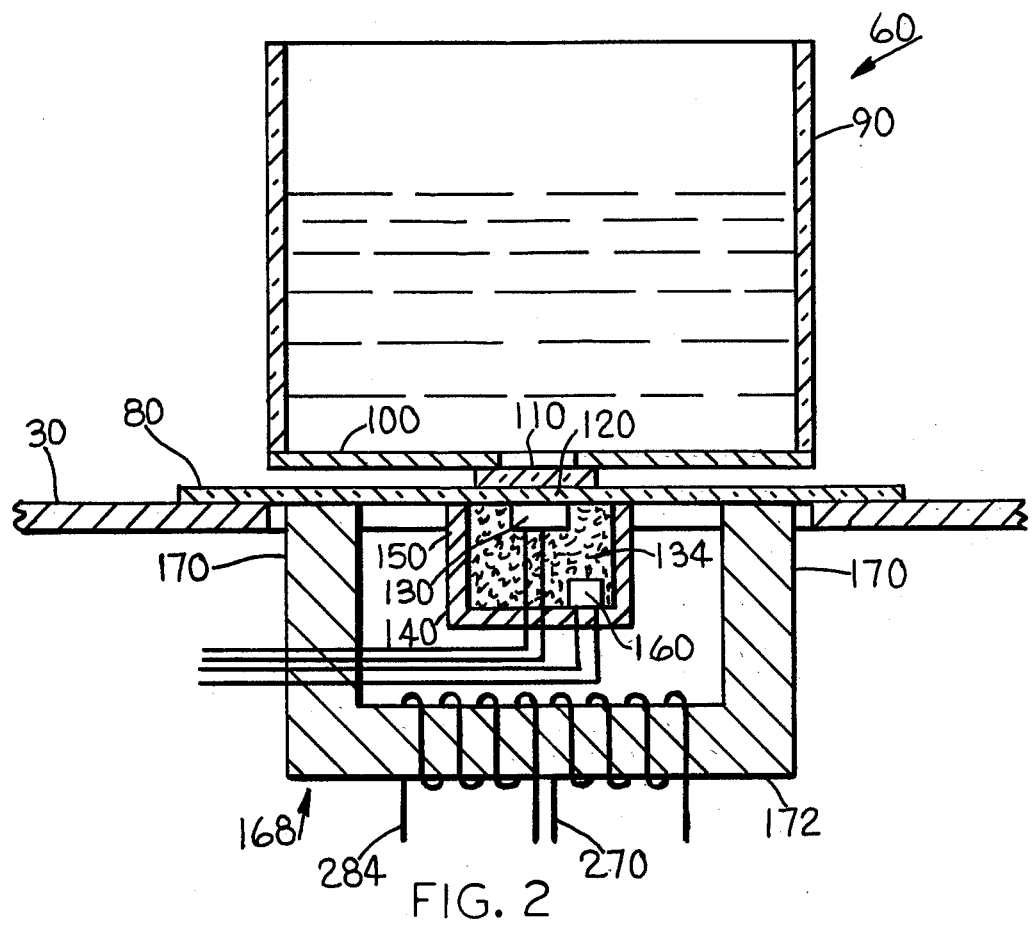
FIG. 2 is an enlarged sectional view of a portion of the apparatus of FIG. 1.

The apparatus of the invention 20 is embodied in a housing 22 in which the electronics of the apparatus are mounted. The housing has a top or cover plate 30 which carries a circular temperature dial 40 having temperature markings and a selector knob 33 and an area 50 on which a cup 60 carrying a fluid to be heated is adapted to be seated (FIG. 2). The area 50 comprises a cut-out portion 70 which is closed by a thin insulating plate 80 having a thickness of about 10 mils (FIG. 2).

According to the invention referring to FIG. 2, the cup 60 has a cylindrical side wall 90 of glass, plastic, or the like, which is not adversely affected by the fluid which is heated. The cup has a bottom wall of metal such as steel, magnetic stainless steel, or the like, which is a lossy magnetic material which can be inductively heated. The metal bottom wall is provided with a central aperture 110 which is closed by a thin insulating sheet 120 secured to the outer surface of the metal bottom wall. The metal bottom wall has a thickness of about 20 mils, and the insulating sheet is of an epoxy fiberglass having a thickness of about 10 mils which permits favorable temperature sensing of a fluid in the cup and response of the associated control circuit, to be described. The bottom wall of the cup is secured to the plastic side wall 90 by means of an epoxy cement which has a thermal coefficient which matches that of the material of the metal bottom wall.

Referring again to the cover plate 30 of the housing 22 and to the lower surface of the assembly, a temperature-sensing diode 130 is secured to the lower surface of the insulating sheet 80 in alignment with the insulating sheet 120 on the bottom of the cup 60 when the cup is seated on the cover plate.

A cup 140 of a conductive epoxy and filled with a thermal insulating material 134 is secured to the lower surface of the insulating plate 80, with the temperature-sensing diode 130 embedded in the insulating material. A second temperature-sensing diode 160 is embedded within the cup 140 to sense ambient temperature. This diode is termed an ambient temperature compensator.

Finally, a generally U-shaped magnetic core 168 having legs 170 and a base 172 is positioned with its legs engaging the insulating plate 80. The cup 60 and core 168 are dimensioned so that the metal base of the cup overlies the core legs 170 and forms an inductive circuit therewith. The core 168 is non-lossy material, preferably a ferrite, which is not heated by current flow induced therein.

Figure 3:
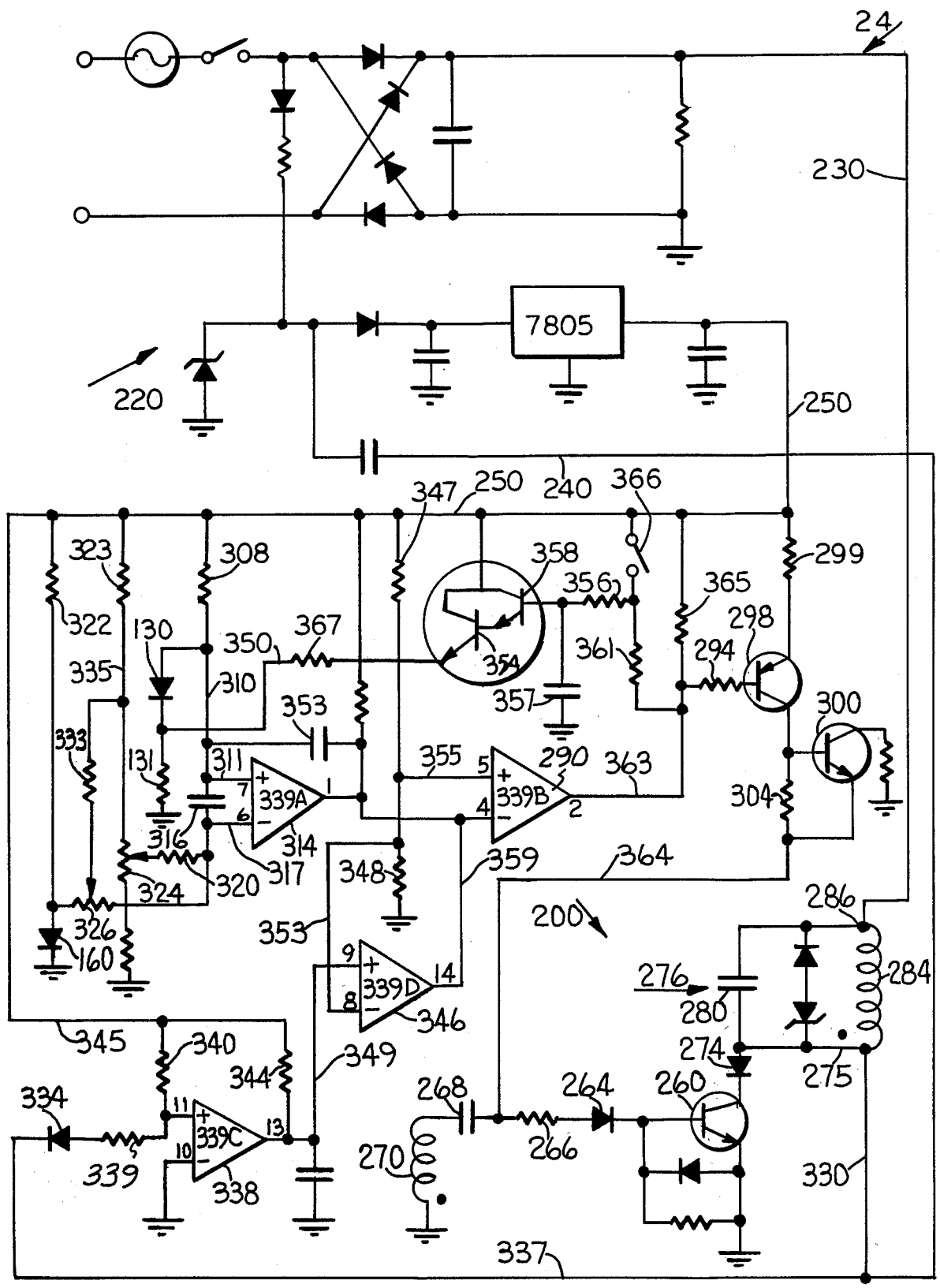
FIG. 3 is a schematic representation of a circuit used in practicing the invention.

An electronic circuit 24 for use with cup 60 in practicing the invention is illustrated in FIG. 3, and this circuit includes a power supply 220 which includes a bus 230 which carries a potential of about 175 volts positive and a bus 250 which carries about 5 volts positive.

The circuit 24 includes an oscillator 200 which is made up of an NPN transistor 260 having its emitter connected to ground and its base coupled through a diode 264 (oriented as shown), a resistor 266 and capacitor 268, and the feedback coil 270 to ground. The collector of the transistor 260 is coupled through a diode 274 (oriented as shown), to one end 275 of a tuned circuit 276 comprising a capacitor 280 and the inductive winding 284. The other end 286 of the tuned circuit 276 is connected to bus 230, and the first end 275 is connected by lead 330 to bus 240 which is returned to the power supply and supplies bursts of power thereto.

The circuit also has a power amplifier which includes a comparator 290, the output of which is coupled through a resistor 294 to the base of a PNP transistor 298 having its emitter connected through a resistive path 299 to the bus 250 and its collector connected both to the base of an NPN transistor 300 and through a resistor 304 to the junction point of resistor 266 and capacitor 268 in the base circuit of the oscillator transistor 260.

In the fluid temperature-sensing portion of the circuit, the temperature-sensing diode 130 has its cathode connected through a resistor 131 to ground and its anode connected (1) through resistor 308 to bus 250 and (2) by leads 310 and 311 to one input of a comparator 314 and through a capacitor 316 and lead 317 to the second input of the comparator 314. The second input of comparator 314 is also connected through lead 317 and a resistor 320 to the adjustable slider of a potentiometer 324 which is connected between the bus 250 and ground, as shown. The ambient temperature-sensing diode 160 has its cathode connected to ground and its anode connected through a potentiometer 326 and lead 317 to the second input of the comparator and through a resistive path 322 to the bus 250. The slider of potentiometer 326 is connected through a resistor 333 to lead 335 which is connected between potentiometer 324 and resistor 323 which is connected to bus 250. The anode of diode 160 is also connected through resistor 322 to bus 250.

The circuit 24 includes a portion for detecting the absence of a cup 60 on the heating apparatus, and this portion of the circuit includes a lead 330 from the end 275 of the tuned oscillator circuit 276 through a diode 334, oriented as shown, and a resistor 339 to one input of a comparator 338, and through a resistor 340 and lead 345 to the bus 250, and through a resistive path 344 to the output of the comparator 338. The other input of comparator 338 is connected to ground. The output of the comparator 338 is connected by resistor 344 to lead 345 and by lead 349 to one input of a comparator 346, the other input of which is connected by lead 353 to a resistor divider made up of resistors 347 and 348 connected between bus 250 and ground. The divider provides a reference voltage to comparator 346 by lead 353 and by lead 355 to one input of comparator 290 in the power amplifier portion of the system. The output of the comparator 346 is connected by lead 359 to the other input of the comparator 290. The output of comparator 290 is connected by lead 363 and resistor 365 to bus 250.

The circuit 24 includes another optional control portion, whose operation will be described below, which includes NPN transistors 354 and 358. The emitter of transistor 354 is connected through resistor 367 and lead 350 to the cathode of temperature-sensing diode 130. The collectors of transistors 354 and 358 are connected to the bus 250, and the base of transistor 354 is connected to the emitter of a transistor 358. The base of transistor 358 is connected (1) through capacitor 357 to ground, and (2) through resistors 356 and 361 and lead 363 to the output of comparator 290. The junction of resistors 356 and 361 is connected through a switch 366 to bus 250.

The four comparator circuits 290, 314, 338, and 346, may be embodied in a single package such as the MC3302P quad comparator which is well known and available commercially. The plus and minus signs shown on the comparators represent the inputs thereto.

In operation of the circuit of FIG. 3, a cup 60 containing a fluid F to be heated is set in place on the cover plate 30 of the apparatus 10 and properly positioned thereon with respect to the heat-sensing diode 130. With switch 366 closed, the control knob 33 on the potentiometer 324 is set to the desired temperature. If heat is called for, that is, if the temperature-sensing diode senses a temperature below the desired, selected temperature for the fluid, it shows a relatively large forward voltage drop, the potential on input terminal 7 of comparator 314 is high, the output at 1 is high, input terminal 4 of comparator 290 is high, the output terminal 2 of comparator 290 is low, transistors 298 and 300 turn on, and the oscillator 200 turns on. Now current flows periodically in the oscillator winding 284, and heating current is induced in metal base of the cup 60, and this heats the fluid F in the cup. As long as heat is called for, the oscillator continues to oscillate and heat is generated, as illustrated at A in FIG. 5.

When the temperature of the fluid reaches the desired level, this is sensed by the sensor diode 130, and the potentials which are developed operate through the comparators 314 and 290 and the other circuit elements to cause the oscillator transistor 260 to turn off.

It is noted that the ambient temperature is sensed by diode 160, and this is combined with the sensing voltage of diode 130 in comparator 314 and in operation of the remainder of the circuit in determining whether and how long the oscillator operates.

Figure 5:
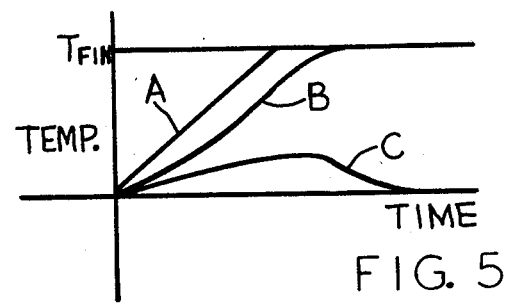
FIG. 5 shows curves relating time and temperature for the apparatus of the invention.

If there is no cup 60 in place on cover plate 30 overlying the magnetic core 168, the oscillator goes on intermittently in normal fashion, and, since there is no loss in the current in the induction heating coil 284 because neither cup nor fluid is present to be heated, as the oscillator voltage follows its normal excursion aong curve A in FIG. 5, a negative voltage pule appears across the coil. This negative pulse is coupled to comparators 338, 346, and 290, and the transistors 298 and 300, to hold of the oscillator transistor 260.

In the circuit of FIG. 3, the resistors 332 and 323 serve to provide ciructi temprature compensation, and capacitors 353 and 316 serve to eliminate the effect of oscillator noise on the circuit.

Under some circumstances, for example, when a relatively small quantity of fluid is to be heated, it may be necessary to sense the amount of heating current which flows and turn off the heating oscillator at a suitable point in the heating cycle, that is, at a time before the sensor 130, which lags behind actual temperature during fast temperature rise, senses the desired final temperature. For this purpose, switch 366 is opened by hand to place the two transistors 354 and 358 in the circuit. The capacitor 357 is now allowed to discharge through the resistor 356 toward zero volts as long as the output of comparator 290 keeps the oscillator 200 in the ON state. The transistors 354 and 358 are required to avoid excessive loading of the integrating capacitor 357 while feeding a signal back to the sensor 130 through resistor 367 which raises the effective sensed temperature to provide early compensated turn-off. Optimum operation is obtained when the magnitude of resistor 367 is chosen to exactly compensate for the steady state sensor temperature lag and the R C time constant of resistor 356 and capacitor 357 matches the rate at which the temperature lag develops. Since compensation depends upon the amount of liquid being heated, compensation should be set for the minimum quantity normally encountered. Smaller amounts of liquid will cause some temperature overshoot, while larger amounts of liquid will be heated more slowly than would be possible with full optimization.

The operation of this portion of the circuit is illustrated by the curves of FIG. 5. Curve A represents the actual temperature rise to the desired temperature T; curve B represents the curve of the temperature-sensing diode; and curve C represents the operation of the overshoot sensing control circuit. In general, the sum of the temperature at a point on curve B with a temperature at a point on curve C equals the temperature on curve A.

Figure 6:
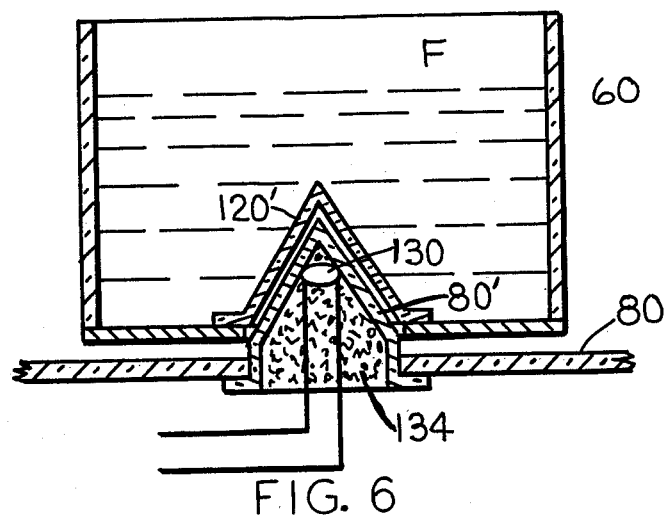
FIG. 6 is a sectional view of a portion of a modification of the invention.
Figure 4:
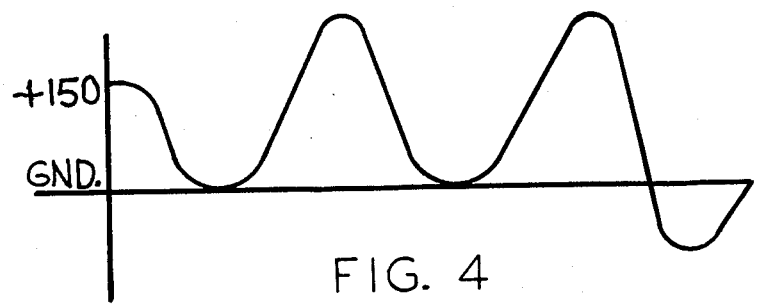

In a modification of the invention shown in FIG. 6, the cup 60 has a thin-walled conical insert 120' of insulating material which projects into the cup from its bottom metal wall and thus into the fluid F in the cup. This is equivalent to thin insulating sheet 120 in FIG. 2. In addition, the insulating plate 80 is provided with a similarly shaped thin-walled insulating cone-shaped member 80' at about its center which mates with the cup insert 120' and on which the cup is seated by means of its insert 120'. The thermal sensor 130 is seated inside member 80' at the apex of the cone, and the cone is filled with insulating material 134.

This apparatus has the advantage that the proper seating of the cup is automatically achieved; the thermal sensor is positioned closer thermally to the fluid of which it is sensing the temperature; and, as a result, the ambient temperature-sensing apparatus may not be required.

The present invention provides relatively simple and inexpensive apparatus for heating a plurality of chemical fluids with temperature control of about one-tenth to one-half of a degree Fahrenheit.

What is claimed is:

1. Fluid heating apparatus comprising
a housing having a top surface,
an aperture in said top surface,
an electrically insulating sheet covering said aperture and having a top surface and a bottom surface,
a container of a conductive material, filled with a thermally insulating material, secured to the bottom surface of said insulating sheet,
a first temperature sensor in said container and disposed adjacent to said insulating sheet,
a second ambient temperature sensor adjacent to the wall of said container, spaced from said first temperature sensor,
a U-shaped magnetic core having legs engaging the bottom surface of said insulating sheet with said container disposed between said legs,
electrical windings on said core for coupling to an oscillating power source,
a fluid-containing cup having a bottom wall which has at least one electrically conductive portion and which can be inductively heated and which is positioned over said magnetic core,
an aperture at about the center of said bottom wall of said cup,
a thin electrically insulating disk secured to the bottom surface of said bottom wall and covering the aperture in said bottom wall, and
means for coupling said temperature sensors to electrical circuitry for controlling said power source.

2. The apparatus defined in claim 1 wherein said electrically conductive portion of the bottom wall of said cup includes a first projection which projects into the interior of the cup, and said support includes a second projection which projects into said first projection and by means of which said cup is seated on and centered on said support.

3. The apparatus defined in claim 2 wherein said first and second projections are generally conical in shape.

4. The system defined in claim 1 wherein said electrical circuitry includes a power amplifier and an oscillator which includes switching means which is turned on by a signal output from said power amplifier.

5. The system defined in claim 4 wherein said first temperature sensor is coupled through a signal comparator to said switch means.

6. The system defined in claim 4 wherein said first temperature sensor is coupled through a signal comparator to said power amplifier which is operated thereby when said sensor senses a temperature which represents the need for heating current.

7. The system defined in claim 6 wherein said second ambient temperature sensor is coupled into said comparator which thus compares the outputs of said first temperature sensor and said second ambient temperature sensor.

8. The system defined in claim 7 wherein said temperature sensors are semiconductor devices whose resistance varies with temperature.

9. The system defined in claim 1 and including cup-sensing means coupled to a portion of said windings to sense voltage swings therein, said cup-sensing means generating a signal when the voltage swings are greater than normal due to the fact that no cup is present and less energy is absorbed from the output of the oscillator than when a cup is present, said cup-sensing means being coupled to said electronic switch means whereby said signal generated thereby turns off said switch means.

* * * * *